United States Patent [19]

Ogishima

[11] Patent Number: 4,515,405
[45] Date of Patent: May 7, 1985

[54] FAIRING DEVICE FOR MOTORCYCLES

[75] Inventor: Tetsuo Ogishima, Saitama, Japan

[73] Assignee: Honda Giken Kogyo Kabushiki Kaisha, Tokyo, Japan

[21] Appl. No.: 629,752

[22] Filed: Jul. 12, 1984

Related U.S. Application Data

[63] Continuation of Ser. No. 379,324, May 18, 1982, abandoned.

[30] Foreign Application Priority Data

May 18, 1981 [JP] Japan .............................. 56-71709[U]
May 18, 1981 [JP] Japan .............................. 56-71710[U]
May 18, 1981 [JP] Japan .............................. 56-71711[U]

[51] Int. Cl.³ .................................................. B62J 17/02
[52] U.S. Cl. .............................. 296/78.1; 280/289 S; 340/134; 362/72; 362/80; 362/369
[58] Field of Search .................. 280/289 S; 296/78.1, 296/37.12; 340/84, 134; 362/72, 80, 368, 369; 361/349, 357; D26/28, 39; D12/182

[56] References Cited

U.S. PATENT DOCUMENTS

| | | | |
|---|---|---|---|
| D. 172,394 | 6/1954 | Kenitz ................................ D26/28 |
| D. 244,522 | 5/1977 | Vetter ................................ D12/182 |
| D. 249,740 | 9/1978 | Vetter ................................ D26/28 |
| 1,425,170 | 8/1922 | Briggs ................................ 361/357 |
| 2,026,957 | 1/1936 | Bauroth ............................ 361/357 |
| 2,440,011 | 4/1948 | Hallman ............................ 340/84 |
| 2,724,770 | 11/1955 | Onksen, Jr. ...................... 362/369 |
| 2,825,888 | 3/1958 | Oldenburg ........................ 362/80 |
| 2,863,095 | 12/1958 | Gayler ............................... 362/72 |
| 3,390,309 | 6/1968 | McGrew, Jr. .................... 296/37.12 |
| 4,019,774 | 4/1977 | Tsukahara et al. ............. 296/78.1 |
| 4,087,110 | 5/1978 | Vetter ................................ 296/78.1 |
| 4,278,285 | 7/1981 | Cummings et al. .............. 296/78.1 |
| 4,344,120 | 8/1982 | Bradley et al. .................. 362/61 |
| 4,355,838 | 10/1982 | Hickman ........................... 296/78.1 |
| 4,356,536 | 10/1982 | Funabashi ......................... 362/72 |
| 4,380,793 | 4/1983 | Potts .................................. 362/369 |
| 4,461,508 | 7/1984 | Ogishima .......................... 296/78.1 |

FOREIGN PATENT DOCUMENTS 2535566 9/1976 Fed. Rep. of Germany ..... 296/78.1
90827 12/1920 Switzerland ........................ 296/78.1

OTHER PUBLICATIONS

*Cycle World*, Nov. 1976, p. 29, BMW Preview.
*Cycle World*, Apr. 1977, p. 105, Vetter Advertisement.

*Primary Examiner*—Robert B. Reeves
*Assistant Examiner*—Dennis H. Pedder
*Attorney, Agent, or Firm*—Irving M. Weiner; Pamela S. Burt

[57] ABSTRACT

A fairing device for motorcycles comprising a fairing member and a pair of right and left turn indicator or blinker units attached to the fairing member. In each of the blinker units, a rearwardly open space is formed by a base member fixed to the fairing member and a lens member integrally secured to the base member. A blinker lamp is disposed within such space, and the space is closed from behind with a removable cover member. The fairing device not only provides enhanced wind shielding and air flow distributing functions, but also facilitates maintenance operations.

14 Claims, 9 Drawing Figures

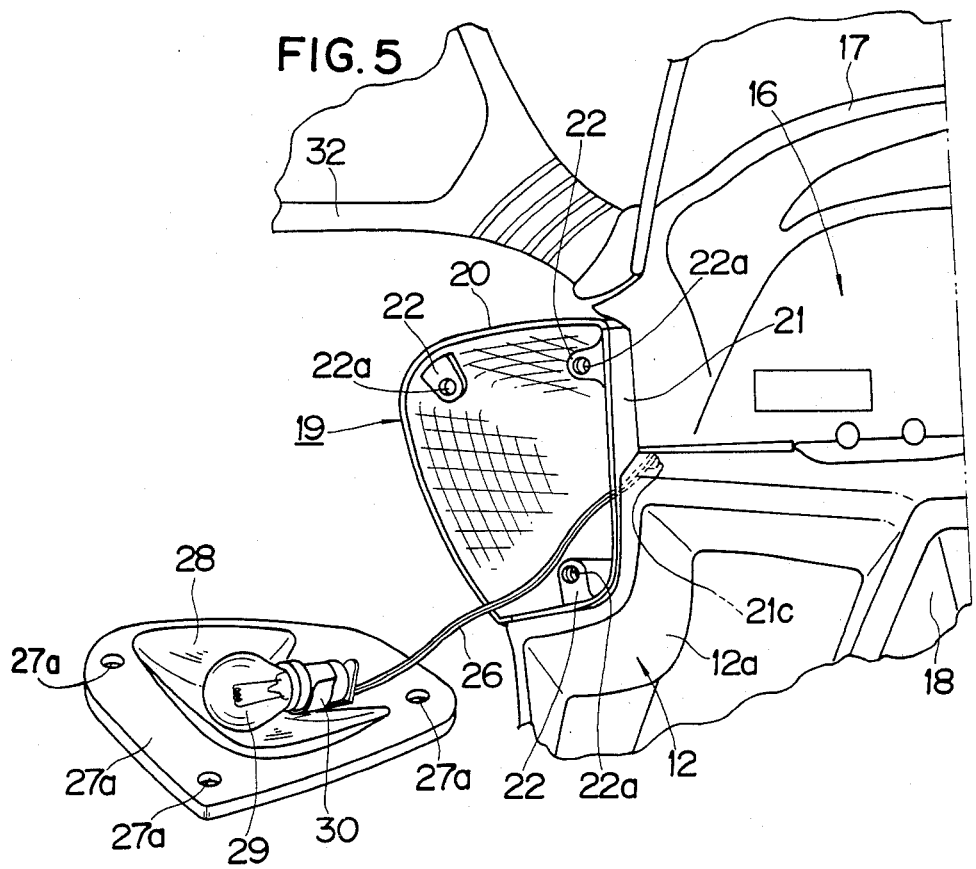
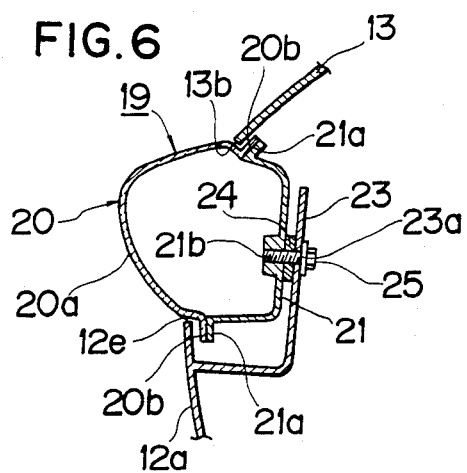
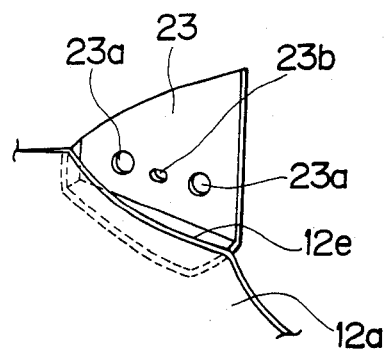

FAIRING DEVICE FOR MOTORCYCLES

This is a continuation of application Ser. No. 379,324, filed May 18, 1982 and now abandoned.

BACKGROUND OF THE INVENTION

1. Field of the Invention

The present invention relates generally to a fairing device for motorcycles. More particularly, the invention relates to a fairing device for motorcycles which includes a pair of right and left turn indicator units.

2. Description of Relevant Art

A fairing device for motorcycles having a pair of right and left turn indicator units is known. Such a conventional fairing device for motorcycles is mounted to the front portion of a motorcycle vehicle body so as to shield the rider(s) from the wind and to enhance air flow distribution, and covers the vehicle front portion. Such a conventional fairing has been somewhat aesthetically useful in improving the external appearance of motorcycles, for example, by incorporating a headlight in a front end of the fairing device or by surrounding the meter unit disposed in front of a handlebar. However, the conventional fairing device still remains unsatisfactory from the standpoint of external appearance inasmuch as, for example, the harness of the lamp disposed within each turn indicator unit is exposed to the exterior. In addition, when replacing the lamp it is necessary to remove the lens of the turn indicator unit, and thus the conventional fairing device is also not considered satisfactory from the standpoint of maintenance.

In view of the foregoing disadvantages, and in consideration of the multi-functionality required of the fairing device, there has been considerable room for improvement of the conventional fairing device.

The present invention effectively overcomes the aforementioned drawbacks attendant the conventional fairing device, and provides a fairing device for motorcycles which is improved with respect to various characteristics such as aesthetic appearance, ease of maintenance, and wind shielding capability.

SUMMARY OF THE INVENTION

The present invention provides a fairing device for motorcycles comprising a fairing assembly fixed to the front portion of a vehicle body and a pair of turn indicator or blinker units disposed at right and left sides of the fairing assembly, each of the turn indicator units having a base member fixed to the fairing assembly, a lens member integrally attached to the base member, a rearwardly open space defined by both the lens member and the base member, a removable cover member which closes the space from behind and a blinker lamp disposed within the space.

It is an object of the present invention to provide a fairing device for motorcycles having a pair of right and left turn indicator units, the fairing device having superior maintenance characteristics, such as with respect to facilitating replacement of the blinker lamps.

Another object of the present invention is to provide a fairing device for motorcycles of the type described hereinabove, the fairing device having a superior external appearance.

A further object of the present invention is to provide a fairing device for motorcycles which improves wind shielding characteristics while also attaining the above set forth objects.

The above and further objects, details and advantages of the present invention will become apparent from the following detailed description of preferred embodiments of the invention, when read in conjunction with the accompanying drawings.

BRIEF DESCRIPTION OF THE DRAWINGS

FIG. 5 is an enlarged rear view of a left turn indicator unit portion of the fairing device shown in FIG. 1, with a cover plate of the turn indicator unit being open.

FIG. 6 is a sectioned view taken through a longitudinal central part of the turn indicator unit of FIG. 5.

FIG. 7 is a perspective view of a stay plate for mounting the turn indicator unit of FIG. 5.

DETAILED DESCRIPTION OF PREFERRED EMBODIMENTS

Figure 1:
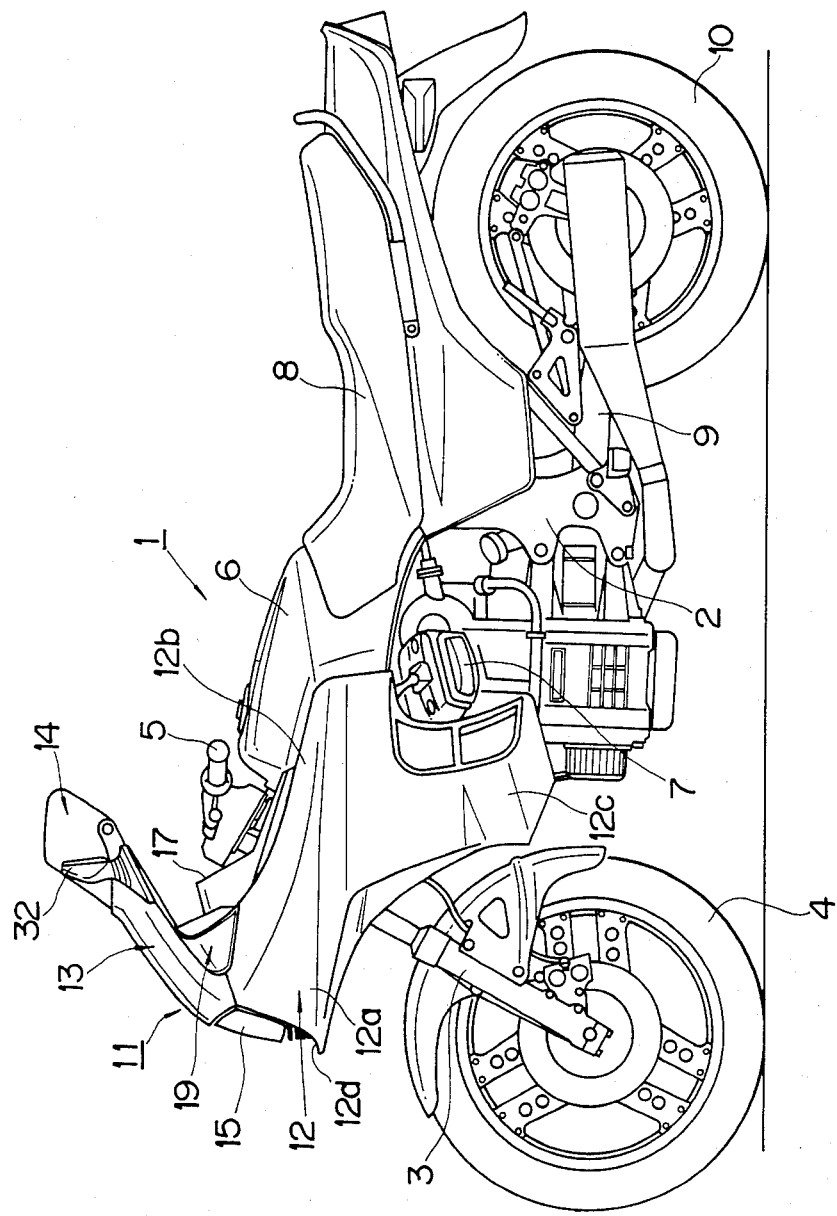
FIG. 1 is a side view of a motorcycle having a fairing device in accordance with a first embodiment of the present invention applied thereto.
Figure 2:
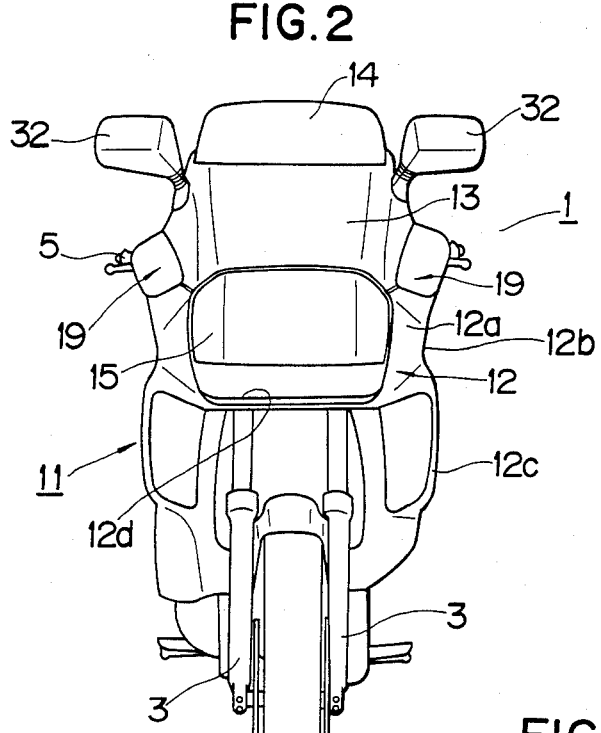
FIG. 2 is a front view of the motorcycle and fairing device of FIG. 1.

With reference to FIGS. 1 through 7, there is shown in FIGS. 1 and 2 a motorcycle 1 having a vehicle body or frame 2. A front fork 3 which supports a front wheel 4 is pivoted for steering movement to the front end portion of the frame 2 through a head tube (not shown). As already known, the upper portion of the front fork 3 is attached to the head tube through upper and lower bridges and is supported thereby. A handlebar 5 is mounted on the upper bridge, a fuel tank 6 is mounted on the frame 2 in a position behind the handlebar 5, an engine is disposed under the fuel tank 6, a seat 8 is disposed behind the fuel tank 6, and a rear fork 9 which supports a rear wheel 10 extends from under a rear portion of the frame 2, with a rear cushion unit (not shown) being disposed between the rear fork 9 and the frame 2.

A fairing assembly 11 formed of a synthetic resin plate or similar material is attached to motorcycle 1 so as to extend from above in front of the front fork 3 and cover both sides of an intermediate part of the fuel tank 6 and both sides of a front part of the engine 7. The fairing assembly 11 comprises a body 12, an upper bonnet member 13 disposed in an upper front position and a windscreen 14 inclined above the front portion. As shown in FIG. 1, the fairing assembly 11 is substantially elbow-shaped in the side view thereof.

Figure 3:
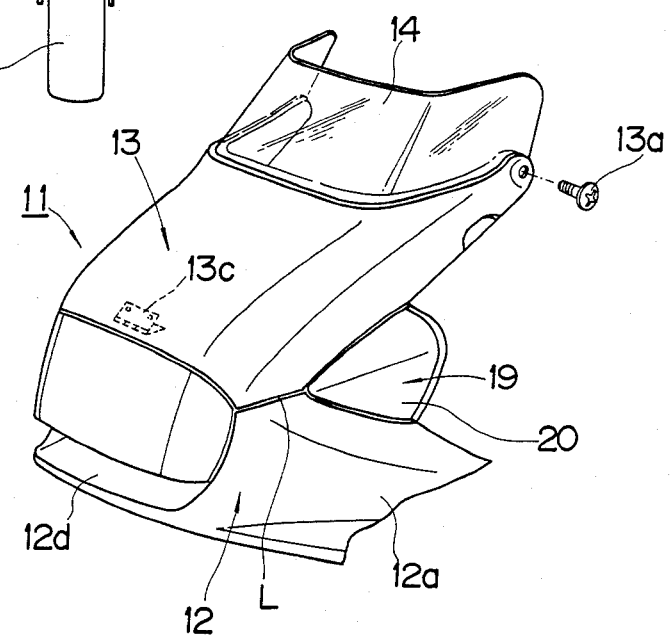
FIG. 3 is a perspective view of the fairing device shown in FIG. 1.

The fairing body 12 comprises a front portion 12a extending forwardly from the upper portion of the front fork 3 and in front of the handlebar 5, an intermediate portion 12b extending on both sides of the intermediate part of the fuel tank 6, and a downwardly extending end portion 12c which extends from a rear part of the front portion and also from the intermediate portion up to both sides of the front part of the engine. The fairing body 12 has a streamlined external shape for enhanced air flow distribution. A headlight 15 is built into the front end portion of the body 12a so that the lower portion and both sides thereof are surrounded by a recessed front portion 12d formed in the front end of the body portion 12a and the upper portion thereof is surrounded by the lower end of the bonnet member 13. In other words, the fairing body 12 and the upper bonnet member 13 define therebetween the front end recess of the fairing assembly 11, in which the headlight 15 is disposed. In this respect, the front portion 12a of fairing body 12 and the upper bonnet member 13 have mating ends which extend on each side of the fairing assembly 11 toward such front end recess. The bonnet member 13 is pivoted at its lower end portion by means of a hinge 13c so as to be pivotable in the longitudinal direction, i.e., so as to be opened and closed above the front portion 12a of the body 12. The bonnet member 13, which is normally closed, is opened for replacement of the bulb of the headlight 15 or for maintenance of a meter unit 16 which is disposed inside the front portion 12a and in front of the handlebar 5. As shown in FIG. 3, the bonnet member 13 is fixed at the right and left upper ends thereof to both lower sides of the windscreen 14 by means of bolts 13a, so that the fairing body 12, the upper bonnet member 13 and the windscreen 14 are combined with each other to form the fairing assembly 11.

Figure 4:
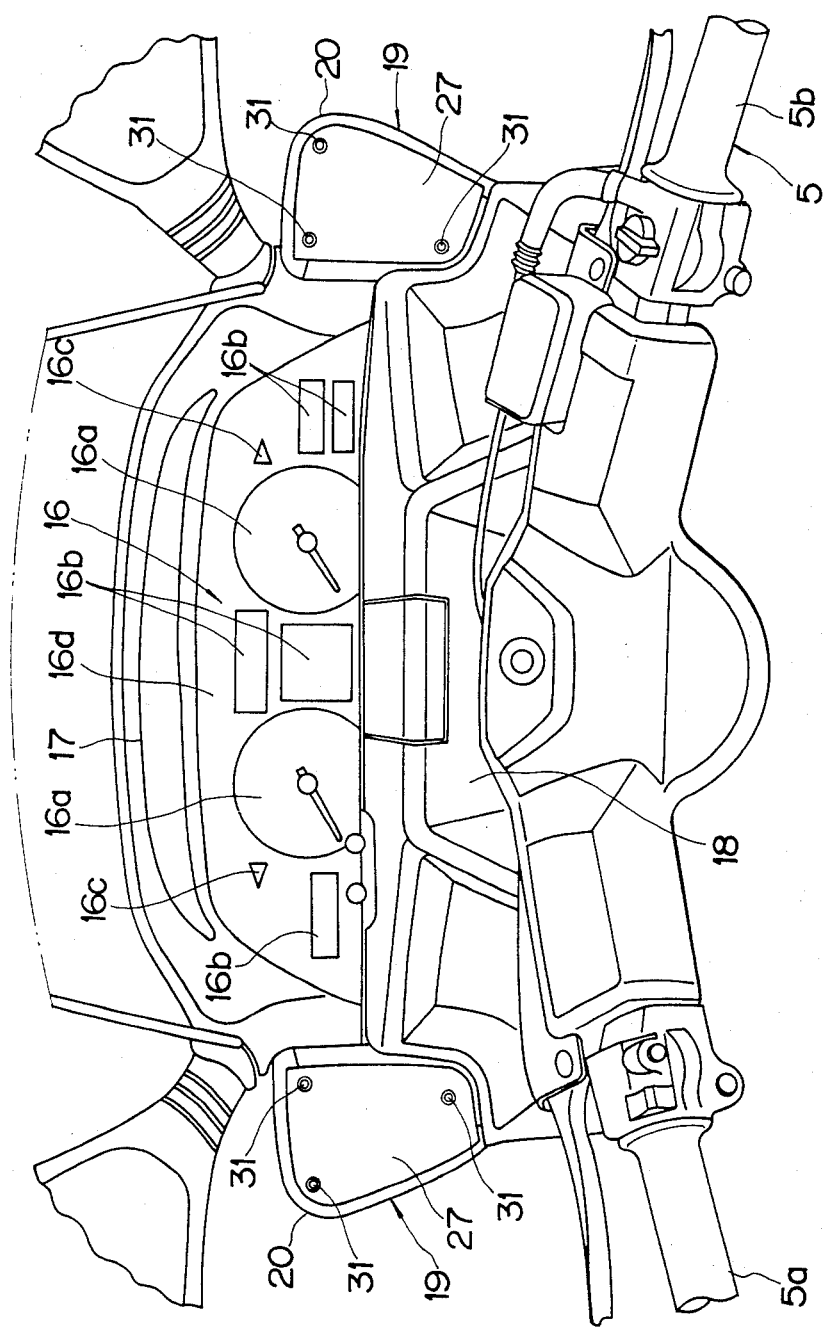
FIG. 4 is an elevational view taken from the rear side of a handlebar of the motorcycle of FIG. 1.

As shown in detail in FIG. 4, the meter unit 16 is mounted in front of the handlebar 5 so that the indicating surface side thereof faces the driver. The meter unit 16 may, for example, be provided with meters 16a such as a speedometer and a tachometer, indicators 16b showing the state of the engine, and driving and turn indicator lamps 16c, all of which are mounted in a meter panel 16d. Above the panel 16d is disposed a meter visor 17, while below the panel 16d is disposed an inner panel 18.

As shown in FIGS. 2 and 3, front turn indicator or blinker units 19 are disposed at right and left front sides of the body 12 in close proximity to the aforesaid mating ends of the front portion 12a of the fairing body 12 and upper bonnet member 13 so that they define an impression integral with the fairing assembly 11, and are covered with a box-like lens member 20 having a substantially trigonal pyramid-shaped appearance wherein the front portion comprises the top. Particularly, as clearly shown in FIG. 2, the lens members 20 are positioned at the rightmost portion and at the leftmost portion, respectively, of the fairing assembly 11. Further, as clearly shown in FIG. 3, each of the blinker units 19 is positioned behind the headlight 15 and at the inner side of the bent portion of the substantially elbow-shaped fairing assembly 11. As is apparent from FIGS. 5 and 6, the lens member 20 comprises a substantially V-shaped colored lens body 20a which swells outwardly in a sideward direction, and is joined to a substantially L-shaped base 21. The lens body 20a is provided at a portion of its upper and lower edges with connecting flange portions 20b, and the flange portions 20b are overlapped and bonded with flange portions 21a formed at the corresponding upper and lower edges of the base 21, whereby the lens body 20a and the base 21 are rendered integral with each other. In the base 21 is formed a mounting hole 21b and a harness insertion hole 21c. The joined body of the lens body 20a and the base 21 has an open rear portion 20c in which a plurality of brackets 22 are integrally mounted by means of the lens body 20a or the base 21, the brackets 22 each having a threaded mounting hole 22a.

As shown in FIG. 3, the lens member 20 of the above described construction is mounted behind a mating surface L between the mating ends of the front portion 12a of the fairing body 12 and the bonnet member 13. As shown in FIGS. 6 and 7, a substantially L-shaped stay plate 23 is formed integrally with the front portion 12a inside and behind the mating surface L at the upper end of the front portion 12a, the stay plate 23 being provided with a mounting hole 23a and a harness insertion hole 23b. The stay plate 23 and the back of the blinker base 21 are opposed to each other with a rubber bushing 24 or the like interposed therebetween, and a bolt 25 is inserted in the mounting holes 23a and 21b and tightened to connect the stay plate 23 and base 21 with each other, while a harness 26 (FIG. 5) is inserted through the insertion holes 23b and 21c into the lens member 20. The upper and lower connecting flange portions 20b and 21a of the lens body 20a and the base 21 respectively are covered from above with a corresponding edge 13b of the bonnet member 13 and covered from below with a corresponding edge 12e of the front portion 12a. The base 21 is disposed between the edge 12e and the stay plate 23, and the substantially trigonal pyramid-shaped lens body 20a alone bulges outwardly in a sideward direction.

In FIGS. 4 and 5, there is shown a cover plate 27 for the open rear portion 20c of the lens member 20. The cover plate 27 is provided in its outer side portion with mounting holes 27a, and on its inner surface with a reflector 28 and a connecting and holding terminal 30 for a blinker bulb 29 disposed below the central part of the reflector 28, the terminal 30 being connected to the harness 26. The cover plate 27 is positioned on the rear portion 20c, and bolts 31 are inserted through the mounting holes 27a and threadedly engaged with the mounting holes 22a of the brackets 22 to fix the cover plate 27 to the lens member 20. Thus, the harness 26 is accommodated within the lens member 20 and the blinker bulb 29 is disposed in the space defined by lens member 20 and base member 21. Maintenance operations such as replacement of the bulb 29 may be performed by removing the bolts 31 and opening the cover plate 27 as shown in FIG. 5, i.e., it is not necessary to dismantle the lens portion. A rear mirror 32 is mounted on each of right and left sides of the bonnet member 13, and in this embodiment the rear mirrors 32 are disposed so as to project sidewardly above the turn indicator units 19, i.e., the turn indicator units 19 are secured to the fairing assembly 11 in a position below the rear mirrors 32.

The right and left turn indicator units 19, as shown in FIGS. 1 and 4, are disposed so that the backs of the respective cover plates 27 are positioned in front of and facing right and left grip portions 5a of the handlebar 5, the cover plates 27 having a wider area than the grip portions 5a in the vertical and transverse directions. Furthermore, as shown in FIG. 3, the turn indicator units 19 are formed so as to have a streamlined external shape substantially contiguous with the outer surface of the fairing assembly 11 having an air flow distributing function, so that the turn indicator units 19 guide wind outwardly and prevent it from directly blowing against the driver's hands. In this manner, the driver's hands can be effectively protected from cold wind, particularly in cold weather.

Figure 8:
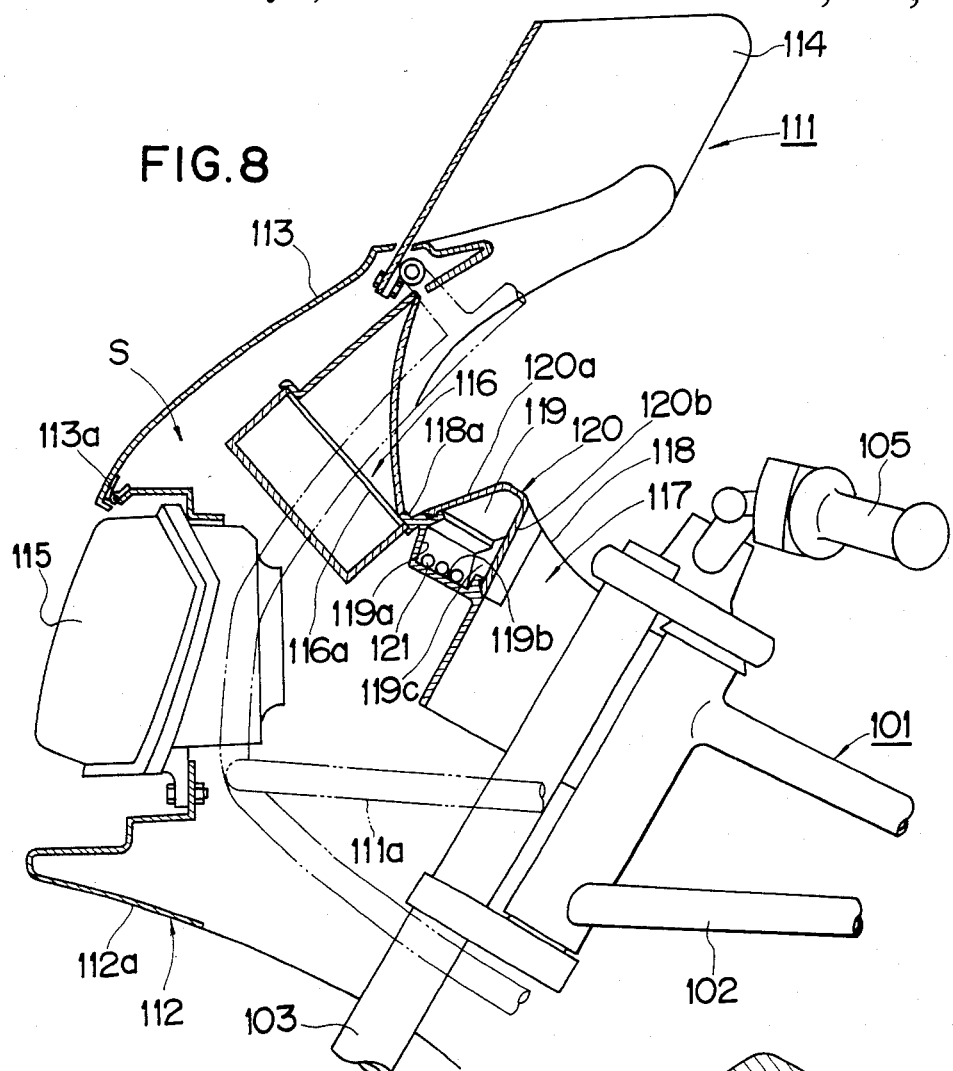
FIG. 8 is a partial side view of a motorcycle having a fairing device according to a second embodiment of the present invention applied thereto, showing a longitudinal section of a transverse central part of the fairing device.
Figure 9:
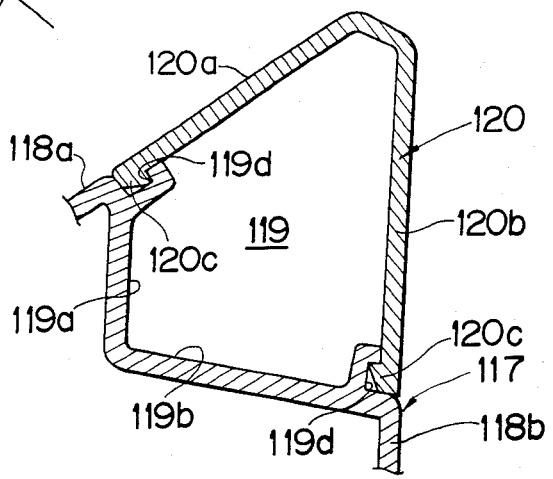
FIG. 9 is an enlarged sectional view of an inner panel of the fairing device shown in FIG. 8.

Referring now to FIGS. 8 and 9, there is shown a fairing assembly 111 attached to a motorcycle 101. The fairing assembly 111 comprises a body 112 fixed through a stay 111a to a vehicle body frame 102 of the motorcycle 101, a bonnet member 113 mounted above the body 112, and a windscreen 114 projecting upwardly above the bonnet member 113. The fairing body 112 has a front portion 112a extending forwardly from the upper portion of a front fork 103 and in front of a handlebar 105 of the motorcycle 101, with a headlight 115 being disposed between the front portion 112a and the bonnet member 113. The bonnet member 113 is pivotable about a hinge portion 113a so as to be opened for maintenance purposes such as repair of meters, etc. disposed within an inside space S. The bonnet member 113 is normally closed as shown in FIG. 8.

Mounted in front of the central part of the handlebar 105 is a meter unit 116 including a meter panel 116a on which are mounted meters, indicators, etc. (not shown), and between the panel 116a and the handlebar 105 is disposed an inner panel 117 having a width relatively greater than that of the panel 116a. The panels 116a and 117 comprise inner walls of the fairing assembly 111 as shown in FIG. 8. The inner panel 117 is formed as a curved panel having a somewhat forwardly swollen central portion. An outer wall 118 of the inner panel 117 is substantially V-shaped in section and has an oblique wall portion 118a extending to the driver's side obliquely upwardly approximately perpendicularly to the panel 116a and a longitudinal wall portion 118b which is generally dependent from the upper end, i.e., an end portion closest to the driver, of the oblique wall portion 118a. In the central portion of the inner panel 117 is formed a recessed portion 119 which is defined in front by a longitudinal wall 119a extending downwardly from the oblique wall portion 118a, defined below by a transverse wall 119b extending rearwardly, i.e., toward the driver, from the lower end of the longitudinal wall 119a, and further defined in this embodiment at its side portions by right and left side walls 119c. Furthermore, the upper portion of the recess 119 is covered with a lid 120 so as to be opened and closed, the lid 120 having a substantially V-shaped section. Within the recess 119 are disposed a plurality of fuses 121 which comprise part of an electrical system of the motorcycle 101. The lid 120 comprises an oblique portion 120a and a longitudinal portion 120b which are contiguous and approximately in parallel with the oblique wall portion 118a and the longitudinal wall portion 118b of the outer wall 118 of the inner panel 117. The lid 120 is provided at each of its end portions with a retaining projection 120c, while a retaining groove 119d is formed at the upper end of the longitudinal wall 119a and also at the rear end of the transverse wall 119b. The recess 119 is closed by engagement of such retaining projections and grooves. The outer wall 118 of the panel 117 including the lid 120 comprises a covering portion for the meter unit 116, etc.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

I claim:

1. In a fairing device for a motorcycle, including a fairing assembly, a pair of rear mirrors mounted on respective sides of said fairing assembly and a pair of blinker units mounted on respective sides of said fairing assembly, wherein said fairing assembly is mounted on a frame of said motorcycle so as to cover a front portion of said motorcycle and has at a front end portion thereof a recess in which a headlight is disposed, the improvement wherein:
   said fairing assembly comprises a fairing body defining a lower part thereof, an upper member combined with and disposed above said fairing body and a windscreen fixed with said upper member, said fairing body and said upper member defining said front end recess therebetween and having mating ends which extend on each side of said fairing assembly toward said front end recess;
   each of said blinker units comprises a lens member, a base member for holding said lens member, and a blinker bulb disposed in a space defined by said lens member and said base member;
   each of said blinker units has a streamlined external shape substantially contiguous with the external shape of said fairing assembly;
   each of said blinker units is secured to said fairing assembly in close proximity to said mating ends of said fairing body and said upper member, behind said headlight and below said rear mirror and said lens members of said pair of blinker units are positioned at the rightmost portion and at the leftmost portion, respectively, of said fairing assembly in front of a grip portion at the corresponding side of a handlebar of said motorcycle whereby said blinker units guide wind outwardly and prevent it from directly blowing against said grip portions.

2. A fairing device according to claim 1, wherein:
   said fairing assembly is substantially elbow-shaped in the side view thereof; and
   each said blinker unit is positioned at the inner side of a bent portion of said elbow-shaped fairing assembly.

3. A fairing device according to claim 1, wherein:
   said base member is fixed to said fairing member through a stay member, said stay member being surrounded by said fairing assembly so as to be substantially concealed from the exterior.

4. A fairing device according to claim 1, wherein:
   said base member has a substantially U-shaped section;
   said lens member has a substantially V-shaped section; and
   said base member and said lens member are formed substantially integrally with each other through opposing flanges, said flanges being formed in at least part of each of opposed upper and lower edges of said base member and said lens member.

5. A fairing device according to claim 1, wherein:
   each of said blinker units includes a harness member for electrically connecting between a blinker switch of said motorcycle and said blinker lamp; and
   said base member has a contact portion in substantial contact with said fairing member, said contact portion having an insertion hole formed therein, and part of said harness member being inserted through said insertion hole into said space.

6. A fairing device according to claim 5, wherein:
   the remaining part of said harness member is disposed within a space defined by said fairing assembly, said space being substantially concealed from the exterior.

7. A fairing device according to claim 1, wherein:
said fairing assembly has an inner panel member incorporating therein at least one fuse of an electrical system of said motorcycle.

8. A fairing device according to claim 7, wherein:
said inner panel member has a convex portion projecting upwardly in a substantially inverted V-shaped form, with a downwardly depressed concave portion being formed in part of said convex portion; and
said fuse is accommodated within said concave portion.

9. A fairing device according to claim 8, wherein:
said concave portion is provided with a removable lid member attached thereto, said lid member having an external form contiguous with said convex portion.

10. A fairing device according to claim 1, further comprising:
a wiring harness for said blinker bulb;
each said blinker unit having an associated insertion hole provided in a portion of said fairing assembly, and a terminal for said blinker bulb disposed in said space defined by said lens member and said base member; and
said wiring harness being connected through said insertion hole to said terminal.

11. A fairing device according to claim 1, wherein:
each said blinker unit has a substantially trigonal pyramid-shaped appearance with the front end thereof defining the top corner; and
each said blinker unit is bolted to said fairing assembly.

12. A fairing device according to claim 1, wherein:
each said blinker unit further comprises a removable cover which closes said space defined by said lens member and said base member from behind.

13. A fairing device according to claim 12, wherein:
said blinker lamp is attached to said cover.

14. A fairing device according to claim 12, wherein:
said cover is positioned in front of said grip portion and occupies an area substantially wider than that occupied by said grip portion.

* * * * *